(12) United States Patent
Adeli-Nadjafi

(10) Patent No.: US 11,847,616 B2
(45) Date of Patent: Dec. 19, 2023

(54) APPARATUS FOR WAGE INDEX CLASSIFICATION

(71) Applicant: Stynt Inc., Boston, MA (US)

(72) Inventor: Alireza Adeli-Nadjafi, Boston, MA (US)

(73) Assignee: Stynt Inc., Boston, MA (US)

( * ) Notice: Subject to any disclaimer, the term of this patent is extended or adjusted under 35 U.S.C. 154(b) by 0 days.

(21) Appl. No.: 17/743,958

(22) Filed: May 13, 2022

(65) Prior Publication Data

US 2023/0368147 A1    Nov. 16, 2023

(51) Int. Cl.
*G06Q 10/1053* (2023.01)
*G06N 5/022* (2023.01)

(52) U.S. Cl.
CPC ......... *G06Q 10/1053* (2013.01); *G06N 5/022* (2013.01)

(58) Field of Classification Search
CPC ............................ G06Q 10/1053; G06N 5/022
USPC ......................................................... 705/321
See application file for complete search history.

(56) References Cited

U.S. PATENT DOCUMENTS

| | | | |
|---|---|---|---|
| 6,735,571 | B2 | 5/2004 | Coleman et al. |
| 8,001,057 | B1 | 8/2011 | Hill |
| 10,657,331 | B2 | 5/2020 | Avkd et al. |
| 2002/0143752 | A1* | 10/2002 | Plunkett ............... G06Q 10/105 |
| 2005/0234759 | A1* | 10/2005 | Coleman ................ G06N 20/00 |
| | | | 705/7.34 |
| 2008/0065467 | A1* | 3/2008 | Nyegaard .......... G06Q 30/0203 |
| | | | 705/7.33 |
| 2009/0089124 | A1* | 4/2009 | Henderson ......... G06Q 10/1053 |
| | | | 705/321 |

(Continued)

FOREIGN PATENT DOCUMENTS

WO      2019108133      6/2019

OTHER PUBLICATIONS

Kenthapadi, Krishnaram, Ahsan Chudhary, and Stuart Ambler. "LinkedIn Salary: A system for secure collection and presentation of structured compensation insights to job seekers." 2017 IEEE Symposium on Privacy-Aware Computing (PAC). IEEE, 2017. (Year: 2017).*

(Continued)

*Primary Examiner* — Laura Yesildag
*Assistant Examiner* — Corey Russ
(74) *Attorney, Agent, or Firm* — CALDWELL INTELLECTUAL PROPERTY LAW

(57) ABSTRACT

In an aspect, an apparatus for wage index classification is disclosed. The apparatus may include a processor and a memory. A processor may be configured to receive a wage index from a user. A processor may also extract a candidate datum from a plurality of candidates. Candidate datum is then classified to a wage index classification data. This may be achieved through training a wage index classifier using candidate training data correlating candidate data elements to wage index classification data elements and classifying the candidate data to the wage index classification datum using the wage index classifier. A processor may then generate a wage compatibility score as a function of wage index classification data and a posting datum. Then a processor may be configured to transmit to a display device configured to display a wage compatibility score.

18 Claims, 9 Drawing Sheets

(56) References Cited

U.S. PATENT DOCUMENTS

| | | | | |
|---|---|---|---|---|
| 2010/0121858 | A1* | 5/2010 | Goettsch | G06Q 30/02 |
| | | | | 707/E17.084 |
| 2012/0022897 | A1* | 1/2012 | Shafer | G06Q 40/08 |
| | | | | 705/4 |
| 2015/0058240 | A1* | 2/2015 | Goettsch | G06Q 30/02 |
| | | | | 705/321 |
| 2015/0339631 | A1* | 11/2015 | Hodges | H04L 67/306 |
| | | | | 705/319 |
| 2015/0347954 | A1* | 12/2015 | Stern | G06Q 10/063112 |
| | | | | 705/7.14 |
| 2015/0348215 | A1* | 12/2015 | Doll | G06Q 30/018 |
| | | | | 705/32 |
| 2018/0039946 | A1 | 2/2018 | Bolte et al. | |
| 2018/0232751 | A1 | 8/2018 | Terhark et al. | |
| 2019/0325529 | A1* | 10/2019 | Haitz | G06Q 10/0635 |
| 2020/0065770 | A1* | 2/2020 | Janapareddy | G06Q 10/1053 |
| 2020/0302396 | A1* | 9/2020 | Xiao | G06F 21/84 |
| 2020/0302398 | A1* | 9/2020 | Wali | G06Q 10/1053 |
| 2020/0380446 | A1* | 12/2020 | Tolstonogov | G06Q 10/06393 |
| 2021/0027403 | A1* | 1/2021 | Khan | G06N 20/00 |
| 2021/0357835 | A1 | 11/2021 | Modi et al. | |
| 2021/0383308 | A1* | 12/2021 | Hanna | G06Q 10/06398 |
| 2022/0092547 | A1* | 3/2022 | Garg | G06N 3/045 |

OTHER PUBLICATIONS

Ahn, Seokjin, et al. "A fuzzy logic based machine learning tool for supporting big data business analytics in complex artificial intelligence environments." 2019 IEEE international conference on fuzzy systems (FUZZ-IEEE). IEEE, 2019. (Year: 2019).*

Apatean et al., Machine-Learning Based Application for Staff Recruiting, Dec. 31, 2017.

* cited by examiner

APPARATUS FOR WAGE INDEX CLASSIFICATION

FIELD OF THE INVENTION

The present invention generally relates to the field of human resource technology. In particular, the present invention is directed to an apparatus for wage index classification.

BACKGROUND

Classifying wage ranges for candidates and postings is an inexact process overly reliant on guesswork. Programmatic attempts to alleviate this issue are in turn hampered by a lack of knowledge on the part of the programmers themselves.

SUMMARY OF THE DISCLOSURE

In an aspect, an apparatus for wage index classification is disclosed. The apparatus may include a processor and a memory. A processor may be configured to receive a wage index from a user. A processor may also extract a candidate datum from a plurality of candidates. Candidate datum is then classified to a wage index classification data. This may be achieved through training a wage index classifier using candidate training data correlating candidate data elements to wage index classification data elements and classifying the candidate data to the wage index classification datum using the wage index classifier. A processor may then generate a wage compatibility score as a function of wage index classification data and a posting datum. Then a processor may be configured to transmit to a display device configured to display a wage compatibility score These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems and methods for an apparatus for wage index classification is disclosed. The apparatus may include a processor and a memory. A processor may be configured to receive a wage index from a user. A processor may also extract a candidate datum from a plurality of candidates. Candidate datum may then be classified to a wage index classification data. This may be achieved through training a wage index classifier using candidate training data correlating candidate data elements to wage index classification data elements and classifying the candidate data to the wage index classification datum using the wage index classifier. A processor may then generate a wage compatibility score as a function of wage index classification data and a posting datum. Then a processor may be configured to transmit to a display device configured to display a wage compatibility score. Exemplary embodiments illustrating aspects of the present disclosure are described below in the context of several specific examples.

Figure 1:
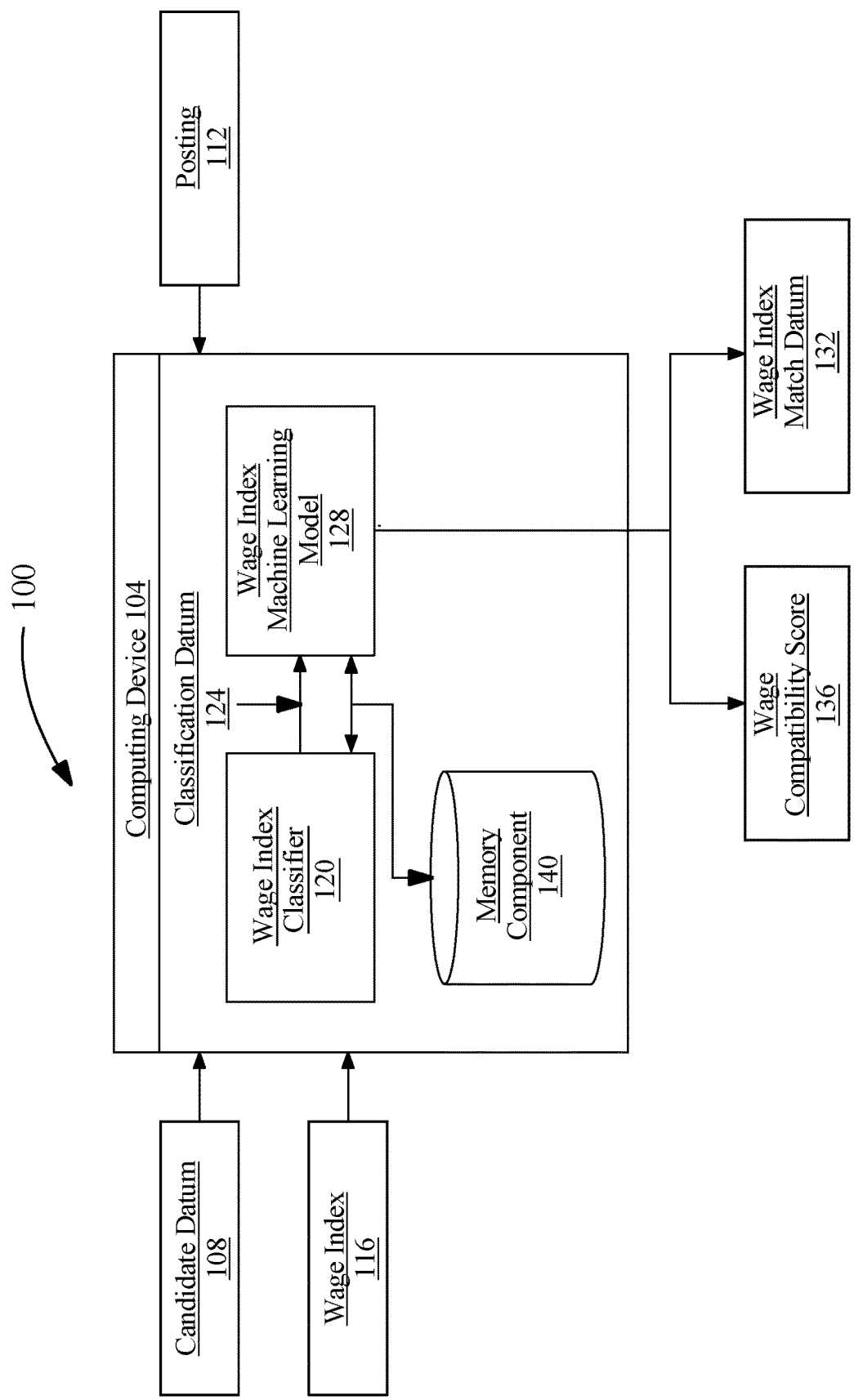
FIG. 1 is a block diagram of an apparatus for wage index classification.

Referring now to FIG. 1, an exemplary embodiment of an apparatus 100 for wage index classification is illustrated. System includes a processor 104. processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. processor 104may include a single computing device operating independently, or may include two or more computing device operating in concert, in parallel, sequentially or the like; two or more computing devices may be included together in a single computing device or in two or more computing devices. processor 104may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. processor 104may include but is not limited to, for example, a computing device or cluster of computing devices in a first location and a second computing device or cluster of computing devices in a second location. processor 104 may include one or more computing devices dedicated to data storage, security, distribution of traffic for load balancing, and the like. processor 104 may distribute one or more computing tasks as described below across a plurality of computing devices of computing device, which may operate in parallel, in series, redundantly, or in any other manner used for distribution of tasks or memory between computing devices. processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may be configured to receive a candidate datum 108, as previously mentioned. For the purposes of this disclosure, "candidate datum" is a candidates personal information and/or attributes relevant to a job position of a posting. Candidate datum 108 may be audio and/or visual information related to the user's personal information, attributes, and/or credentials. For example, candidate datum may be a video, audio file, text, and the like. Candidate datum 108 may include a user's prior record, such as a resume, personal address, social security number, phone number, employment history, experience level, education, certification, acquired skills, geographical location, expected compensation, job performance acknowledgements (e.g., awards, honors, distinguishments), photograph of user, sample work product, and the like. Candidate datum 108 may be received by processor 104 by the same or similar means described above. For example, and without limitation, candidate datum 108 may be provided by a user directly, database, third-party application, remote device, immutable sequential listing, social media profile, and the like. In non-limiting embodiments, candidate datum 108 may be provided as independent or unorganized facts, such as answers to prompted questions provided by processor 104 and/or as dependent or organized facts, such as a previously prepared record that the user made in advance.

With continued reference to FIG. 1, processor 104 is configured to receive a posting datum 112. For the purpose of this disclosure, "posting datum" is information related to an available and/or open job position. For the purposes of this disclosure, a "job position" (also referred to in this disclosure as a "job") is an occupation with designated tasks associated therewith. The job position may be paid. The job position may be unpaid. A job position may include an employment with an employer, such as work as an employee (part-time or full-time), intern, worker, contractor, self-employed, and the like. For example, and without limitation, posting datum 112 may include information and/or data from a job posting and/or listing that describes an open job position. Posting datum 112 may include a job position title, qualifications and/or requirements for the job position, expected responsibilities associated with the job position, benefits with the job position, wage index 116, geographical location, employer information, and the like. Posting datum 112 may include information related to an employer's expectations of a person hired for such a job position. For instance, and without limitations, posting datum 112 may include minimum qualifications that a candidate must possess to adequately perform the job position. Qualifications for job position may include education, certification, experience, desired skills and/or abilities, personal qualities, and the like. Posting datum 112 may also include information that a person hired for the job position may expect from the job position. For instance, and without limitation, posting datum 112 may include working hours for the job position, a type of salary, degree of professionalism, and the like. In one or more embodiments, posting datum 112 may include a datum or a plurality of data related to an available job.

In one or more embodiments, posting datum 112 may be provided to or received by processor 104 using various means. In one or more embodiments, posting datum 112 may be provided to processor 104 by a user, such as an employer or human resources professional that is interested in hiring for a job position by the employer of the job position. A user may manually input posting datum 112 into computing device using, for example, a graphic user interface and/or an input device. For example, and without limitation, a user may use a peripheral input device to navigate graphic user interface and provide posting datum 112 to processor 104. Non-limiting exemplary input devices include keyboards, joy sticks, light pens, tracker balls, scanners, tablet, microphones, mouses, switches, buttons, sliders, touchscreens, and the like. In other embodiments, posting datum 112 may be provided to processor 104 by a database over a network from, for example, a network-based platform. Posting datum 112 may be stored in a database and communicated to processor 104 upon a retrieval request form a user and/or from processor 104. In other embodiments, posting datum 112 may be communicated from a third-party application, such as from a third-party application on a third-party server, using a network. For example, posting datum 112 may be downloaded from a hosting website for job listings. In one or more embodiments, processor 104 may extract posting datum 112 from an accumulation of information provided by a database. For instance, and without limitation, computing device may extract needed information from database regarding the job position and avoid taking any information determined to be unnecessary. This may be performed by processor 104 using a machine-learning model, which is described in this disclosure further below.

With continued reference to FIG. 1, processor 104 is configured to receive a wage index 116. As used in the current disclosure, a "wage index" is an estimated range of monetary compensation an employee will receive for a given position. For example, monetary compensation may include cash, stock options, cryptocurrency, benefits, retirement contributions, insurance, and the like. Monetary compensation may include wages, overtime wages, salary, piece work rate, commission, bonus, tips, and the like. In some embodiments, a desired wage index 116 may be input into a processor 104 by a user. In other embodiments, a wage index 116 may be input into a processor 104 by an employer based on a job posting 112. Wage index may be calculated based on based on candidate datum 108. Wage index may also be calculated based on the availability of candidates or job postings 112. Wage index may also be calculated based on the monetary compensation of candidates whose experience, qualifications, and education are similar to the current candidate.

With continued reference to FIG. 1, wage index 116 may include a geographical wage index. As used in the current disclosure, "geographical wage index" is a wage index 116 that includes only a pre-determined geographic area. Geographical wage index may group candidate wage index and/or posting wage index together as a function of their geographic proximity. In embodiments, Geographic proximity may include any radius from a given point. Geographic proximity may also include a city, county, state, zip code, area code, and the like. For example, the wage indexes for investment bankers may be classified as a function of being located in New York City. In another example, wage indexes for an investment banker may be classified as a function of being located in Los Angeles County.

With continued reference to FIG. 1, Processor 104 may be configured to generate wage index classification datum 124. As used in the current disclosure, "wage index classification datum" is a manner of grouping a wage index to a posting datum 112 and/or a candidate datum 108 as a function of past and present posting datum 112 and/or candidate datum 108. In embodiments, wage index classification datum 124 may include sorting, grouping, matching, ranking of candidates. Candidates may be classified based on any combination of traits, skills, experiences disclosed within candidate datum. In a non-limiting example, a classification datum may pair a user's candidate datum 108 to posting 112. Additionally, classification datum 124 may pair a candidate wage index to a postings wage index. A classification datum may pair a user's candidate datum 108 to a candidate wage index or posting 112 to a posting wage index. Furthermore, classification datum may include the pairing of a candidate datum 108 to a wage index 116 may then be paired to a posting 116. In a further non-limiting example, classification datum may include a pairing of an candidate's credential datum 112 with a posting wage index.

Still referring to FIG. 1, computing device may identify a plurality of candidate traits and classify candidates to a wage index by any of their traits disclosed in candidate datum 108. Alternatively or additionally, processor 104 may identify plurality of wage index classification datum by querying a classification data base. using user-entered data. In an embodiment, "wage rang classification database" may include any data structure for ordered storage and retrieval of data, which may be implemented as a hardware or software module. classification database may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a classification database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a classification database may reflect categories, cohorts, and/or populations of data consistently with this disclosure.

With continued reference to FIG. 1, machine-learning processes may include wage index classifier 120, defined as processes whereby a processor 104 derives, from training data, a model for sorting inputs into categories or bins of data. Inputs into a wage index classifier 120 may include wage index 116, candidate datum 108, past and present posting datum 112 and/or candidate datum 108. The output of the wage index classifier 120 is classification datum 124. Wage index classifier may be trained using past or present classification datum 124, match datum 132, and wage compatibility score 136. Classification may be performed using, without limitation, linear classifiers such as without limitation logistic regression and/or naive Bayes classifiers, nearest neighbor classifiers including without limitation k-nearest neighbors classifiers, support vector machines, decision trees, boosted trees, random forest classifiers, and/or neural network-based classifiers.

Still referring to FIG. 1, processor 104 may be configured to generate wage index classifier 120 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate wage index classifier 120 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where a is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of user-entered words and/or phrases, a plurality of attributes of a candidate data item, such as spoken or written text, objects depicted in images, metadata, or the like, to clusters representing themes.

With continued reference to FIG. 1, Processor 104 may be configured to generate wage index match datum 132 using a wage index machine learning model 128. As used in the current disclosure, "wage index match datum" is a calculation a wage index 116 for a user based upon candidate datum 108 and posting datum 112. Whereas inputs to the to the machine learning model 128 may include wage index 116, wage index classification datum 124, candidate datum 108, employer input, classification datum 124, and job posting 112. While the output to the machine learning model is wage index match datum 132 or wage compatibility score 136. The machine learning model 128 may be trained using any past match datum 132 or wage compatibility score 136. Candidate training data is a plurality of data entries containing a plurality of inputs that are correlated to a plurality of outputs for training a processor by a machine-learning process to align to match candidates with job postings. For example, candidate training data may correlate user's candidate datum 108 to posting 112. Additionally, candidate training data may correlate a candidate wage index to a postings wage index. A candidate training data may correlate a user's candidate datum 108 to a candidate wage index or posting 112 to a posting wage index. Furthermore, candidate training data may include the correlation of a candidate datum 108 to a wage index 116 may then be paired to a posting 116.

Candidate training data may contain information about the candidate, candidate datum 108, Job posting 112, wage index classification datum 124. Candidate training data may include any wage index classification datum 124 or candidate datum 132 stored in a database, remote data storage device, or a user input or device. Candidate training data may be retrieved from a database or other data structure.

With continued reference to FIG. 1, wage range match datum 132 may include candidate wage index. As used in the current disclosure, a "candidate wage index" is a calculation of the estimated wage index 116 for a given candidate based on candidate datum 108. For example, Candidate wage index may be calculated by classifying a user's current candidate datum 108 to the available job postings. A user may be classified to the available job postings if their skill and or qualifications matches the requirements of the job posting 112. Candidate wage index may then take the average wage index 116 for current and recently filled postings that are applicable to the user candidate datum 108.

With continued reference to FIG. 1, wage range match datum 132 may include a posting wage index. In the current disclosure, a "posting wage index," is a calculation of the estimated wage index 116 for a given posting. In an embodiment, a posting wage index employer would need to attract a candidate who has certain characteristics or candidate datum 108. In a non-limiting example, posting wage index may be calculated by classifying a posting 112 to current and recently hired candidates wage index. Once candidates are matched to a posting 112, their wage ranges may be averaged together to identify a posting wage index. In other embodiments, posting wage index may also be calculated based on the wage index of postings with similar responsibilities and candidate datum 108 requirements.

With continued reference to FIG. 1, may use several methods to wage range match datum 132. In embodiments, wage range match datum 132 may be generated using a wage index machine learning model. In other embodiments, wage range match datum 132 may be generated using a wage range database or some other data structure. Wage range match datum 132 may be calculated using a fuzzy logic as described herein below.

In one or more embodiments, processor 104 may implement a compatibility algorithm or generate a compatibility machine-learning module, such as machine-learning module 128, to determine a compatibility score 136 between a user and a desired wage index. For the purposes of this disclosure, a "compatibility score" is a measurable value representing the likelihood a user will be able to match a given wage index 116. Compatibility score may represent the likelihood a user may achieve a posting wage index or a candidate wage index. In one or more non-limiting embodiments, compatibility score 136 may be a quantitative characteristic, such as a numerical value within a set range. For example, a compatibility score may be a "2" for a set range of 1-10, where "1" represents a job position and user having a minimum compatibility and "10" represents job position and user having a maximum compatibility. In other non-limiting embodiments, compatibility score 136 may be a quality characteristic, such as a color coding, where each color is associated with a level of compatibility. In one or more embodiments, if a compatibility score 136 is "low", then a user and a job position are considered to have a minimum compatibility; if a compatibility score 136 is "high", then a user and a job position are considered to have a maximum compatibility.

For the purposes of this disclosure, a "compatibility algorithm" is an algorithm that determines the likelihood a user will be successful in achieving a given wage index. For example, if user is considering applying to a plurality of wage ranges, then the compatibility scores between each wage index of the plurality of indexes and the user may be ranked so that the user may determine which wage index the user is most compatible with of the posting or candidate datum Compatibility algorithm may include machine-learning processes that are used to calculate a set of compatibility scores. Machine-learning process may be trained by using training data associated with past calculations and/or information for the job position and user, such as data related to past compatibility scores, candidate datum 108, wage index history, posting wage index, candidate wage index, and posting datum 112, posting datum history, or any other training data described in this disclosure. Compatibility score 136 may be determined by, for example, if a certain numerical value of employment position data matches user data, where the more employment position data that matches user data, the higher the score and the greater the compatibility between the user and the job position. For example, and without limitation, posting datum 112 may include a qualification of requiring a teacher with at least five years of work experience and a posting wage index of a yearly salary of $40,000-$60,000, and candidate datum 108 that may include seven years of work experience in teaching and candidate wage index of $50,000-$70,000, then a numerical value representing compatibility score 136 may be increased due to the data correlating, thus indicating user is more compatible for the posting. In an embodiment, compatibility algorithm may be received from a remote device. In some embodiments, compatibility algorithm is generated by processor 104. In one or more embodiments, compatibility algorithm may be generated as a function of a user input.

In one or more embodiments, a machine-learning process may be used to determine compatibility algorithm or to generate a machine-learning model that may directly calculate compatibility score 136. In one or more embodiments, a machine-learning model may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output, such as compatibility score 136, for an input, such as posting datum 112, wage index 116, candidate datum 108. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

In one or more embodiments, apparatus 100 may further include a memory component 140. Memory component 140 may be communicatively connected to processor 104 and may be configured to store information and/or datum related to apparatus 100, such as posting datum 112, Candidate datum 108, information related to wage index classification datum 124, wage index match datum 132, and compatibility score 136 and the like. In one or more embodiments, memory component 140 is communicatively connected to a processor and configured to contain instructions configuring processor to determine the record recommendation. Memory component 140 may be configured to store information and datum related to posting match recommendation. For example, memory component 140 may store previously prepared records (e.g., draft resumes), customized records generated by processor 104, Posting datum 112, Candidate datum 108, wage index match datum 132, classification datum, and the like. In one or more embodiments, memory component may include a storage device, as described further in this disclosure below.

Figure 2:
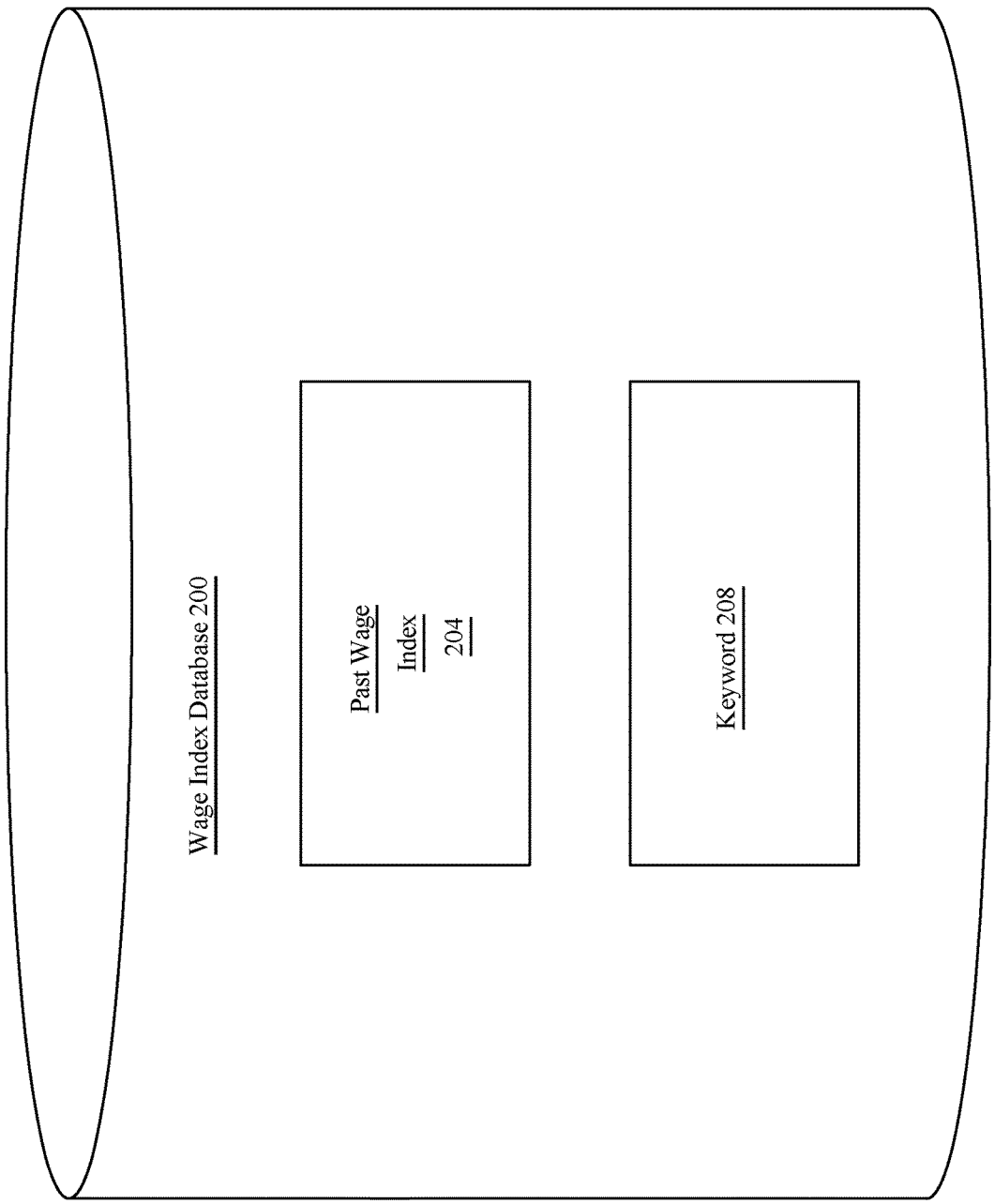
FIG. 2 is a diagrammatic representation of a wage index posting database.

Now referring to FIG. 2, an exemplary wage index database 200 is illustrated by way of block diagram. Past or present wage indexes 204 may be stored in a wage index database 200 (also referred to as "database"). Processor 104 may be communicatively connected with wage index database 200. For example, in some cases, database 200 may be local to processor 104. Alternatively or additionally, in some cases, database 200 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Network may use an immutable sequential listing to securely store database 200. Additionally or alternatively, each wage index, metrics thereof, etc. may be stored in an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Continuing to reference FIG. 2, database 200 may store a plurality of past wage indexes 204. Wage index 115 may be generated using the wage index database 200. As used in this disclosure, "wage index database" is a data structure configured to store data associated with a plurality of wage indexes 204. Database 200 may comprise of wage indexes 204 from the same employer or from connected employers. Database 200 may comprise of all postings from a job board or a job aggregator website. Wage indexes 204 may be uploaded to wage index database from at least a remote device. A "remote device," as used in this disclosure, is a computing device, including but not limited to a mobile device such as a smartphone, tablet, laptop, desktop, and the like. Wage index database 200 may comprise of wage indexes 204 in their entirety or of wage index keyword 208. As used in this disclosure, a "keyword" is any meaningful word or syntax. For example without limitation, a keyword 208 may be "mechanical engineer" in the instance that a posting is looking for a mechanical engineer. In another nonlimiting example, a keyword 208 may be "remote" in an example where the posting is a remote job. Database 200 may be implemented, without limitation, as a relational database, a key-value retrieval datastore such as a NOSQL database, or any other format or structure for use as a datastore that a person skilled in the art would recognize as suitable upon review of the entirety of this disclosure.

Figure 3:
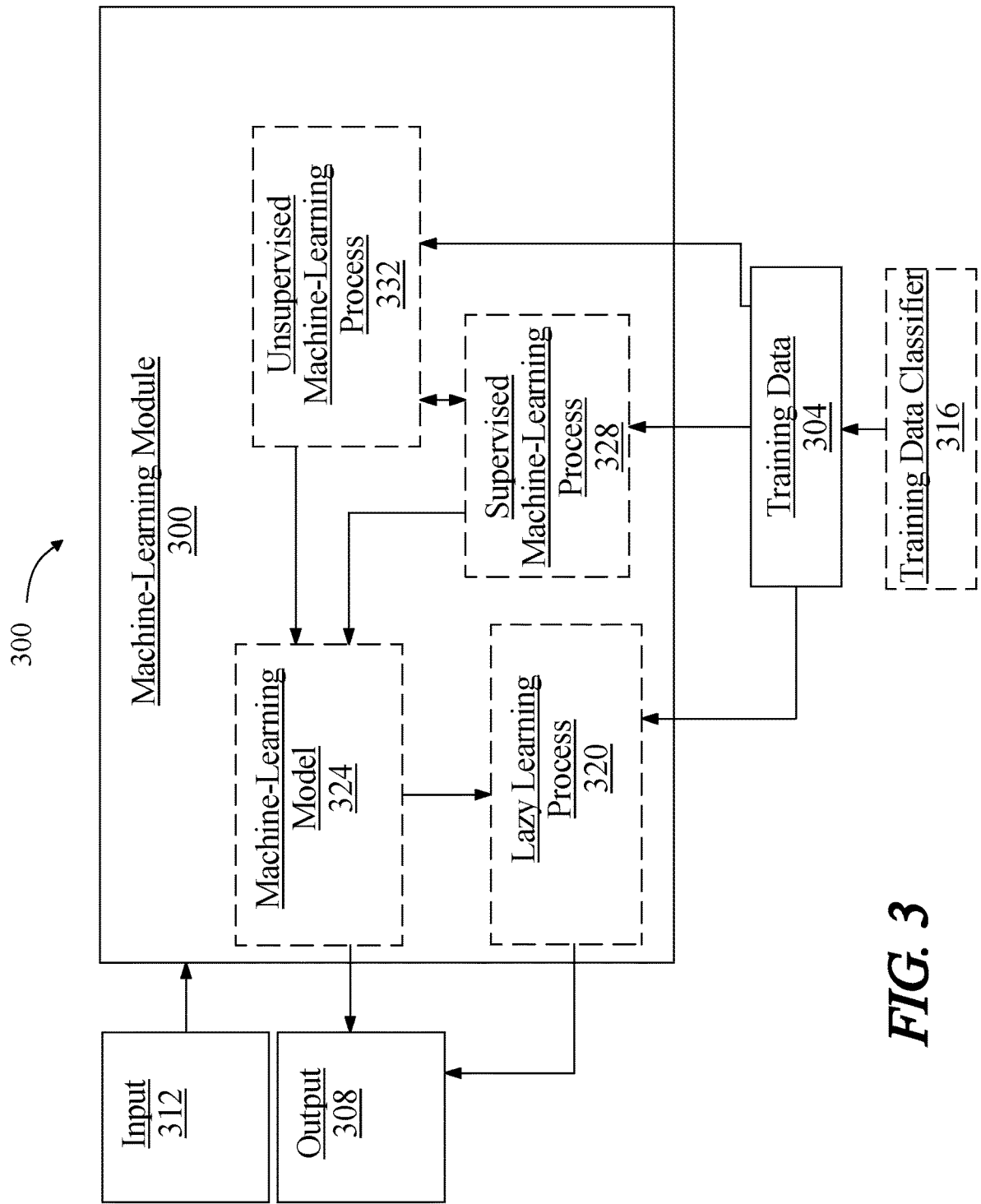
FIG. 3 is a block diagram of exemplary machine-learning processes.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example input data may include attribute data tables and output data may include matching opportunity postings.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of opportunity postings.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include attribute data tables as described above as inputs, matching opportunity postings as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples.

Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
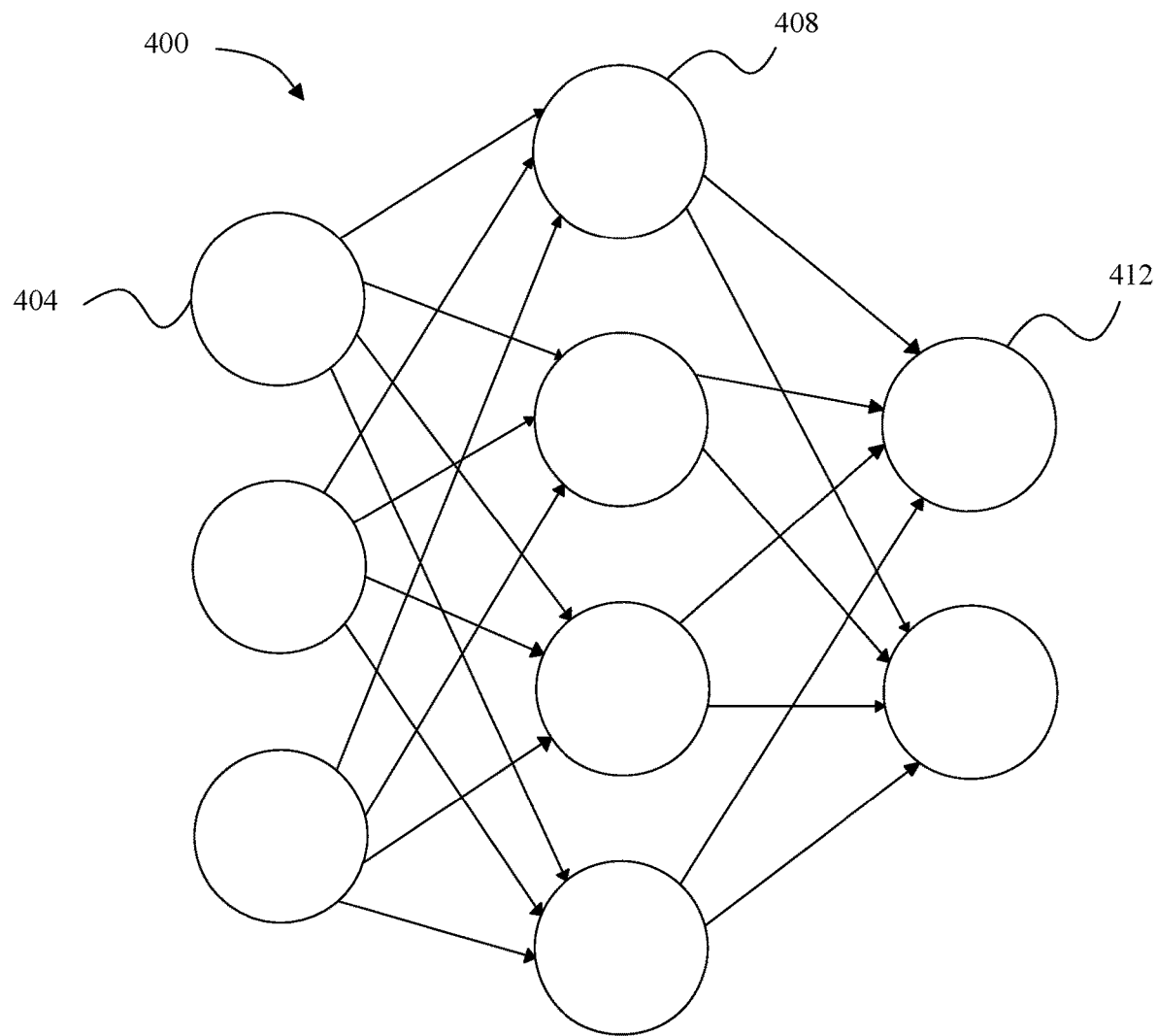
FIG. 4 illustrates an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
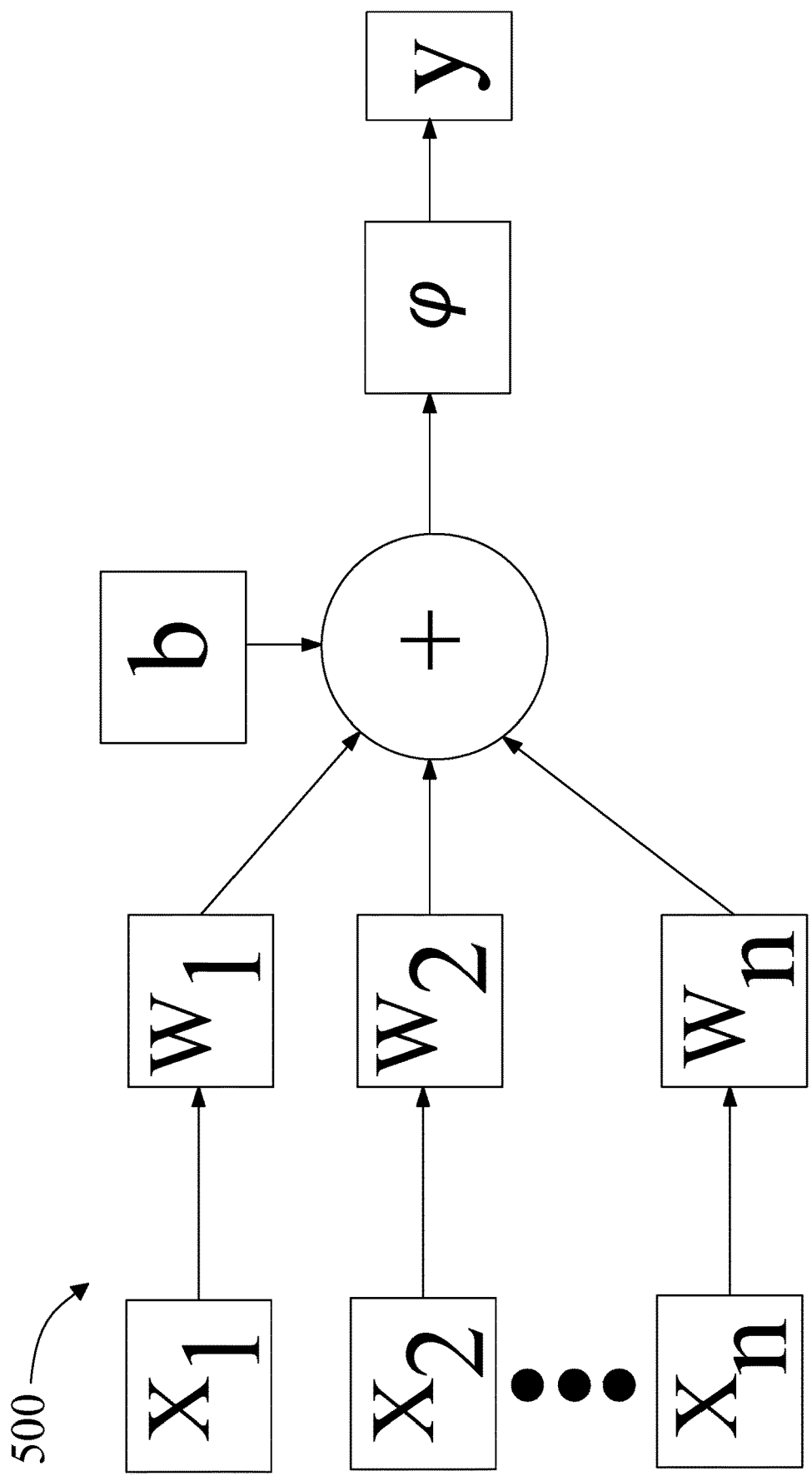
FIG. 5 is a block diagram of an exemplary node.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w^i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
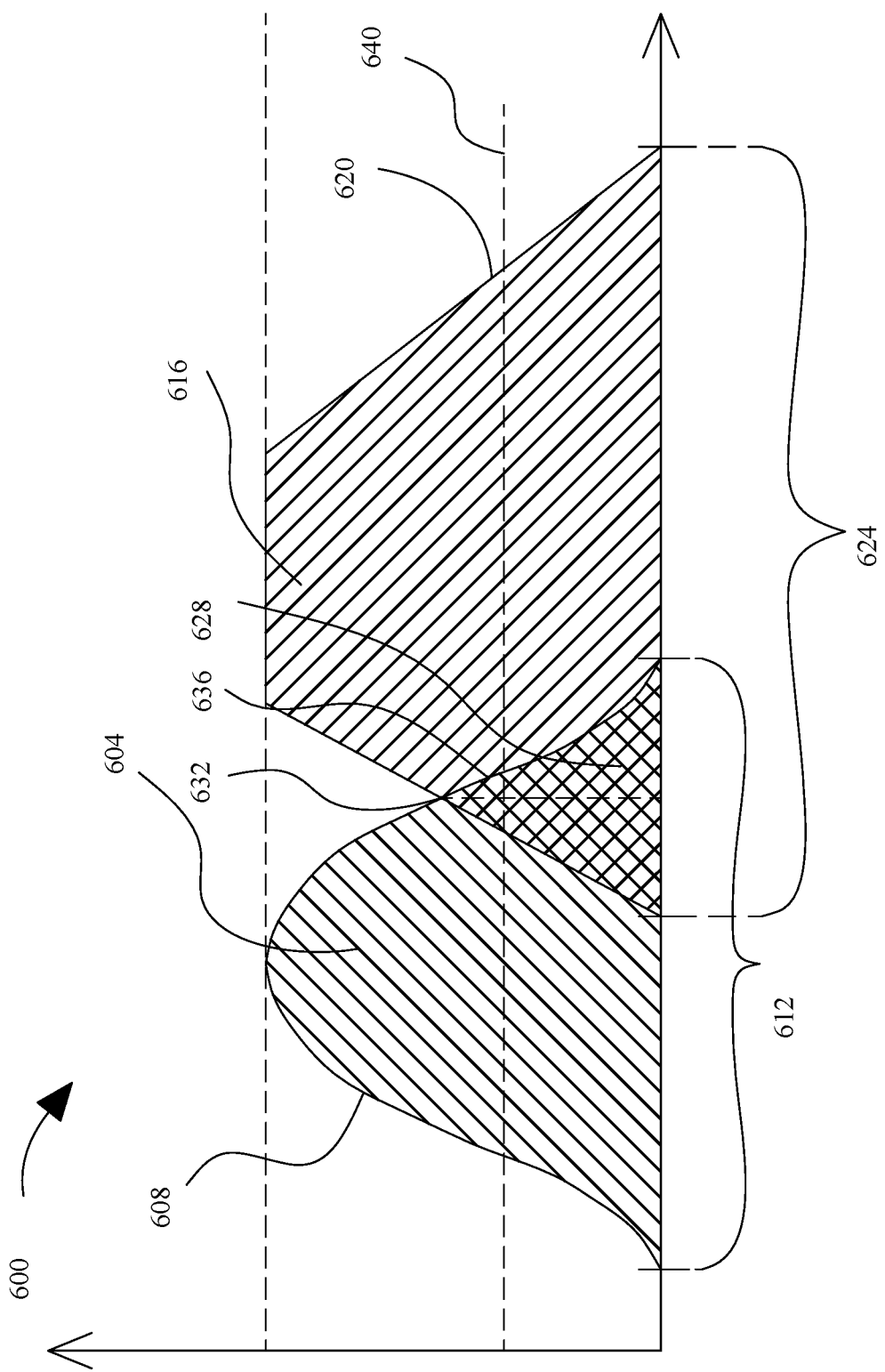
FIG. 6 is a graph illustrating an exemplary relationship between fuzzy sets.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with comparison 180 in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent compatibility threshold 176 and its ranges from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input and/or output wage index variables. For instance, a wage index variable may represent a first measurable value pertaining to the calculation of a wage index such as the amount of experience and/ or education that a candidate has. Continuing the example, an output variable may represent the wage compatibility score 136. An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any software component datum, any source repository datum, any malicious quantifier datum, any predictive threshold datum, any string distance datum, any resource datum, any niche datum, and/or any combination of the above. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, candidate datum 108 may indicate a sufficient degree of overlap with the posting datum 112 for combination to occur as described above. There may be multiple thresholds; for instance, a second threshold may indicate a sufficient match for purposes of past posting and posting query as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if two malicious quantifiers have fuzzy sets matching a malicious component fuzzy set by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Referring back to FIG. 1, processor 104 may automatically publish postings when provided wage compatibility score 136 is within a predetermined threshold. Postings 112 may be posted on any job board and/or job aggregator website specified by an employer. For instance and without limitation, if score 136 of a wage index is between a 6 and 10 (using the scoring system in a previous example), then the processor 104 may publish said posting. As used in this disclosure, a "predetermined threshold" is a limit and/or range of an acceptable quantitative value and/or combination of values such as an n-tuple or function such as linear function of values, and/or representation related to the scoring of a posting. Predetermined threshold may be determined by the employer or user of apparatus 100. Additionally or alternatively, predetermined threshold may be determined by processor 104 using a machine learning module 300.

Figure 7:
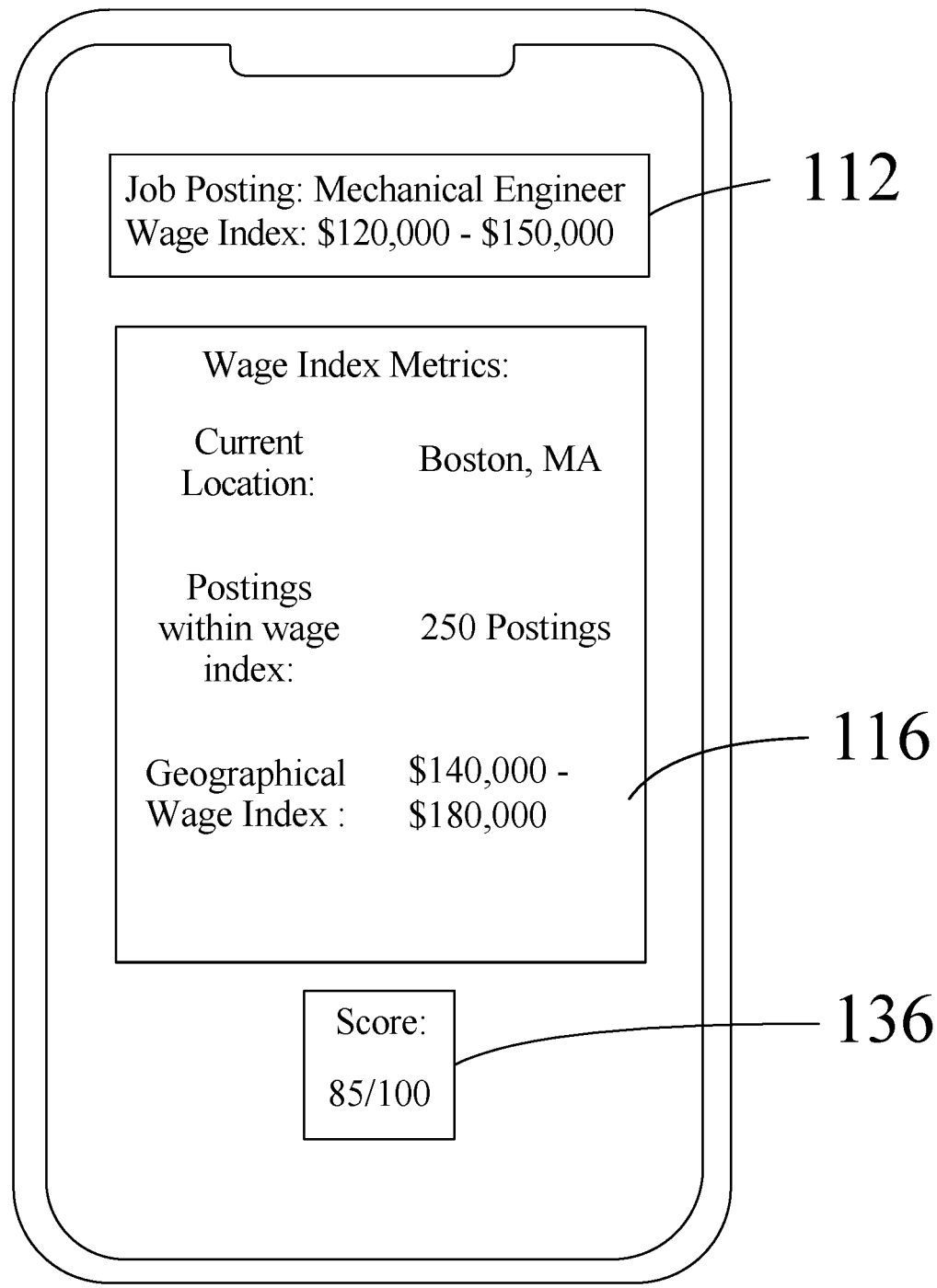
FIG. 7 is diagrammatic representation of an exemplary embodiment of a display device.

With continued reference to FIG. 1, predictive scoring metric is displayed to the employer. Predictive scoring metric is displayed using a graphic user interface (GUI). Alternatively or additionally, score 136 may be displayed using a GUI. GUI may include a plurality of lines, images, symbols, etc. as illustrated in FIG. 7. GUI may be displayed on a display device. Display device may include, but is not limited to, a smartphone, tablet, laptop, monitor, tablet, and the like. Display device may include a separate device that includes a transparent screen configured to display computer generated images and/or information. The employer may view the information displayed on the display device in real time.

Now referring to FIG. 7, a diagrammatic representation of an exemplary embodiment of a display device. Display device may be communicatively connected to the processor 104. In some embodiments, processor 104 may be configured to display Wage Index match datum 132 and/or Wage compatibility score 136 on display device. Wage Index match datum 132 may include any of the aforementioned metrics. In other embodiments, display device may be configured to display score 136 calculated. In some embodiments, display device may be configured to display a color code for the score 136. A "color code," as used in this disclosure, is any color that displays score 136 in terms of cost-efficiency.

Figure 8:
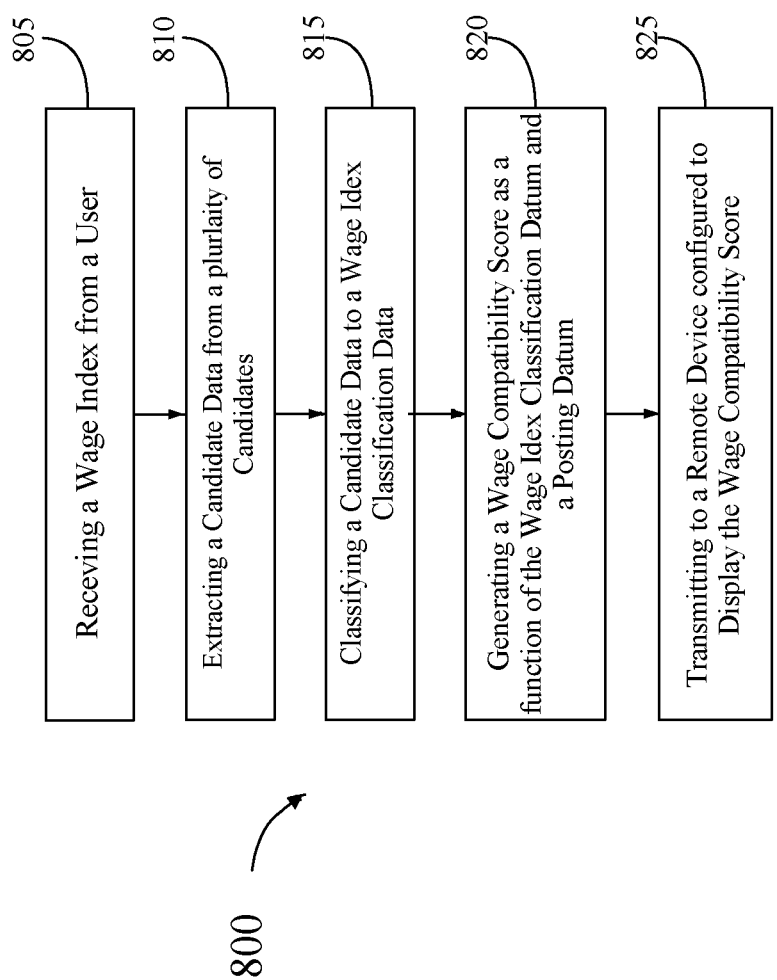
FIG. 8 is a flow diagram of an exemplary method for wage index classification.

Referring now to FIG. 8, an exemplary method 800 of wage index classification is illustrated. At step 805, a processor receives a wage index from a user, this may be implemented, without limitation, as described above in reference to FIGS. 1-7.

At step 810, a processor extracts a candidate data from a plurality of candidates; this may be implemented, without limitation, as described above in reference to FIGS. 1-7.

At step 815, a processor classifies a candidate data to a wage index classification data; this may be implemented, without limitation, as described above in reference to FIGS. 1-7.

At step 820, a processor generates a wage compatibility score as a function of wage index classification datum and a posting datum; this may be implemented, without limitation, as described above in reference to FIGS. 1-7.

At step 825, a processor transmits to a display device to configured to display the wage compatibility score, this may be implemented, without limitation, as described above in reference to FIGS. 1-7.

Further referring to FIG. 8, a processor may further be configured to classify the posting datum to the wage index classification data using a wage index classifier. A wage compatibility score may be generated using a wage index machine learning model. A wage index may include a summation of all financial compensation given to a candidate. A wage index may also include a geographical wage index. A processor can be configured to generate a candidate wage index and/or a posting wage index. A processor may further be configured to store wage index classification datum in a wage index database. A processor may further be configured to classify candidates as a function of the posting. A processor may further be configured to classify posting data to wage index classification data.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
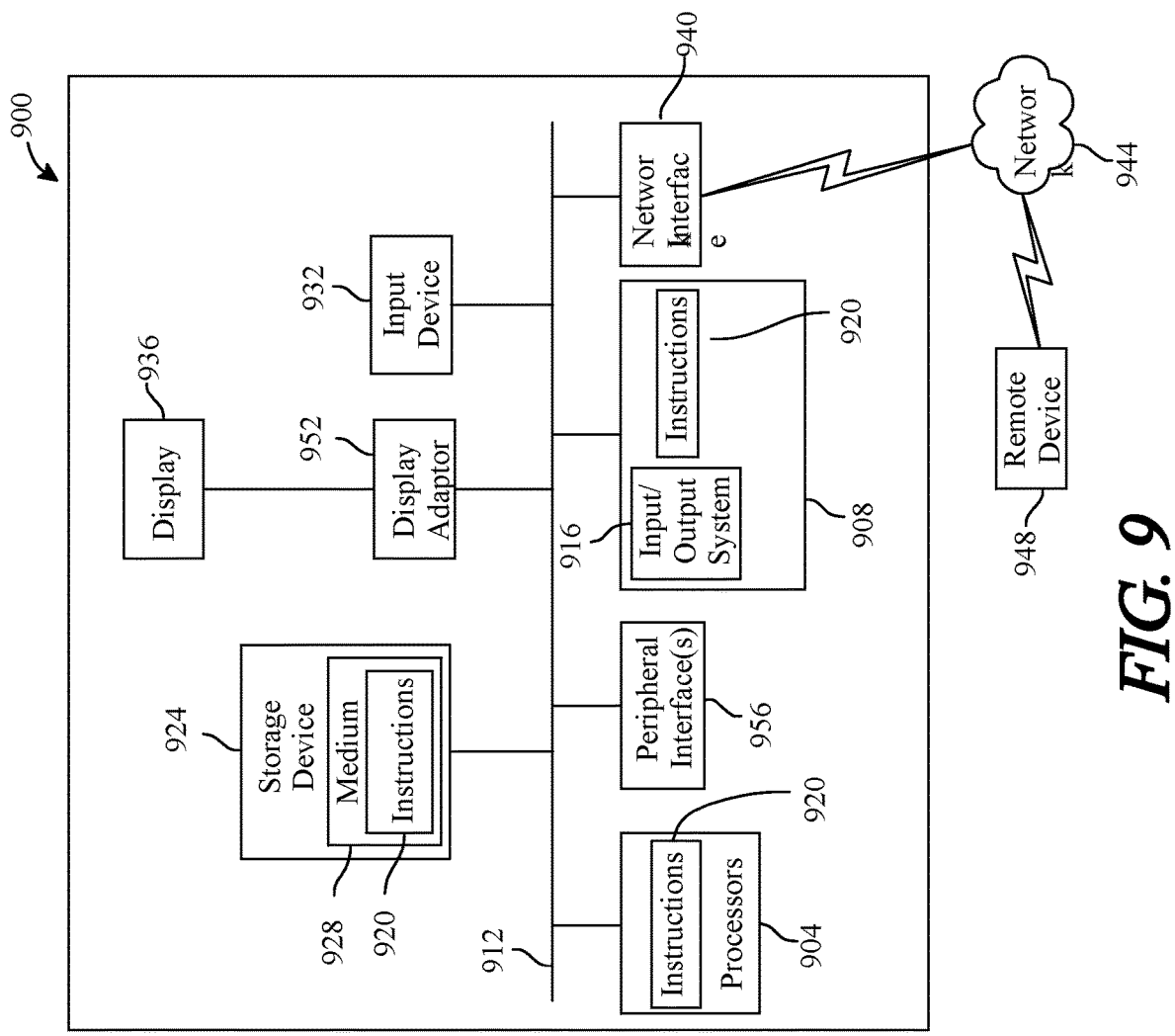
FIG. 9 is a block diagram of a computing system that can be used to implement any one or more of the methodologies disclosed herein and any one or more portions thereof. The drawings are not necessarily to scale and may be illustrated by phantom lines, diagrammatic representations, and fragmentary views. In certain instances, details that are not necessary for an understanding of the embodiments or that render other details difficult to perceive may have been omitted.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for wage index classification, wherein the apparatus comprises:
   at least a processor; and
   a memory communicatively connected to the at least a processor, the memory containing instructions configuring the at least a processor to:
   receive a posting datum including a wage index from a user;
   extract a candidate datum from each of a plurality of candidate;
   classify each candidate datum to a wage index classification datum, wherein classifying each candidate datum further comprises:
   training a wage index classifier using first training data, wherein the first training data contains a plurality of data entries correlating candidate data elements as inputs to wage index classification data elements as outputs; and
   classifying each candidate datum to its respective wage index classification datum using the wage index classifier;
   generate a wage compatibility score as a function of each wage index classification datum and posting datum, wherein generating the wage compatibility score further comprises:
   training a wage index machine learning model using second training data, wherein the second training data contains a plurality of data entries correlating wage index classification data elements and posting data elements as inputs to wage compatibility score elements as outputs; and
   generating, by the trained wage index machine learning model, the wage compatibility score for each wage index classification datum, wherein each wage index classification datum and the posting datum are provided to the trained wage index machine learning model as an input to output each wage compatibility score;
   numerically correlate the plurality of candidates and the posting datum as a function of the compatibility score;
   display each wage compatibility score to the user;
   determine, using a fuzzy inference engine comprising a centroid based defuzzification process, a wage compatibility threshold n-tuple based on each wage compatibility score;
   tune, using a machine learning process, the wage compatibility threshold n-tuple to provide an updated wage compatibility threshold n-tuple; and
   automatically publish the posting if the combination of wage compatibility scores is within the updated wage compatibility threshold n-tuple.

2. The apparatus of claim 1, wherein the at least a processor is further configured to classify the posting datum to the wage index classification data using a wage index classifier.

3. The apparatus of claim 1, wherein the wage index classification datum includes a summation of all financial compensation given to a candidate.

4. The apparatus of claim 1, wherein the wage index classification datum includes a geographical wage index.

5. The apparatus of claim 1, wherein the at least a processor is further configured to generate a candidate wage index.

6. The apparatus of claim 1, wherein the at least a processor is further configured to generate a posting wage index.

7. The apparatus of claim 1, wherein the at least a processor is further configured to classify candidates as a function of the posting datum.

8. The apparatus of claim 1, wherein the at least a processor is further configured rank candidates as function of the wage compatibility score.

9. The apparatus of claim 1, wherein the at least a processor is further configured to determine the wage compatibility score using fuzzy logic.

10. A method for wage index classification, wherein the method comprises:
   receiving, by at least a processor, a posting datum including a wage index from a user;
   extracting, by the at least a processor, a candidate data from each of a plurality of candidates;
   classifying, by the at least a processor, each candidate datum to a wage index classification datum;
   generating, by the at least a processor, a wage compatibility score as a function of each wage index classification datum and a posting datum, wherein generating the wage compatibility score further comprises:
      training a wage index machine learning model using second training data, wherein the second training data contains a plurality of data entries correlating wage index classification data elements and posting data elements as inputs to wage compatibility score elements as outputs; and
      generating, by the trained wage index machine learning model, the wage compatibility score for each wage index classification datum, wherein each wage index classification datum and the posting datum are provided to the trained wage index machine learning model as an input to output each wage compatibility score;
   numerically correlating, by the trained wage index machine learning model, the plurality of candidate and the posting datum as a function of the compatibility score;
   displaying, by the least a processor, the wage compatibility score to the user;
   determining, by the at least a processor, using a fuzzy inference engine comprising a centroid based defuzzification process, a wage compatibility threshold n-tuple based on each wage compatibility score;
   tuning, by the at least a processor, using a machine learning process, the wage compatibility threshold n-tuple to provide an updated wage compatibility threshold n-tuple; and
   automatically publishing, by the at least a processor, the posting if the combination of wage compatibility scores is within a updated wage compatibility threshold n-tuple.

11. The method of claim 10, wherein the at least a processor is further configured to classify the posting datum to the wage index classification data using a wage index classifier.

12. The method of claim 10, wherein the wage index classification datum includes a summation of all financial compensation given to a candidate.

13. The method of claim 10, wherein the wage index classification datum includes a geographical wage index.

14. The method of claim 10, wherein the at least a processor is further configured to generate a candidate wage index.

15. The method of claim 10, wherein the at least a processor is further configured to generate a posting wage index.

16. The method of claim 10, wherein the at least a processor is further configured to classify candidates as a function of the posting datum.

17. The method of claim 10, wherein the at least a processor is further configured rank candidates as function of the wage compatibility score.

18. The method of claim 10, wherein the at least a processor is further configured to determine the wage compatibility score using fuzzy logic.

* * * * *